United States Patent
Lakshmanan et al.

(10) Patent No.: US 8,380,133 B2
(45) Date of Patent: Feb. 19, 2013

(54) BEAMFORMING METHODS AND SYSTEMS EMPLOYING MEASURED POWER AT A RECEIVER TO PERFORM CHANNEL ESTIMATION

(75) Inventors: Sriram Lakshmanan, Atlanta, GA (US); Karthikeyan Sundaresan, Howell, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 310 days.

(21) Appl. No.: 12/724,513

(22) Filed: Mar. 16, 2010

(65) Prior Publication Data

US 2010/0285752 A1    Nov. 11, 2010

Related U.S. Application Data

(60) Provisional application No. 61/177,052, filed on May 11, 2009.

(51) Int. Cl.
*H04B 15/00* (2006.01)
*H04B 17/00* (2006.01)

(52) U.S. Cl. ............ 455/63.4; 455/63.1; 455/226.3; 455/69

(58) Field of Classification Search ............ 455/63.1, 455/63.4, 226.5
See application file for complete search history.

(56) References Cited

U.S. PATENT DOCUMENTS

| | | | | |
|---|---|---|---|---|
| 7,366,247 | B2 * | 4/2008 | Kim et al. ............ | 375/267 |
| 7,453,946 | B2 | 11/2008 | Sondur | |
| 7,609,774 | B2 | 10/2009 | Horng et al. | |
| 8,027,374 | B2 * | 9/2011 | Sun et al. ............ | 375/149 |
| 2005/0157684 | A1 * | 7/2005 | Ylitalo et al. ............ | 370/334 |
| 2006/0044185 | A1 * | 3/2006 | Jin et al. ............ | 342/368 |
| 2008/0192811 | A1 * | 8/2008 | Son ............ | 375/219 |

OTHER PUBLICATIONS

Chen, J., et al. "Joint Synchronization, Channel Length Estimation, and Channel Estimation for the Maximum Likelihood Sequence Estimator for High Speed Wireless Communications". The IEEE Semiannual Vehicular Technology Conference (IEEE VTC). May 2002. pp. 1535-1539.

Fan, J., et al. "Pilot-Aided Channel Estimation Schemes for OFDM Systems With Cyclic Delay Diversity" 2009 IEEE 69th Vehicular Technology Conference (IEEE VTC-Spring). Apr. 2009. pp. 1-5.

Gao, X., et al. "Efficient Channel Estimation for MIMO Single-Carrier Block Transmission With Dual Cyclic Timeslot Structure" IEEE Transactions on Communications. vol. 55, No. 11. Nov. 2007. pp. 2210-2223.

Lakshmanan, S., et al. "Towards Adaptive Beamforming in Indoor Wireless Networks: An Experimental Approach" Proceedings of IEEE International Conference on Computer Communications (INFOCOM). Apr. 2009.

* cited by examiner

*Primary Examiner* — Temesgh Ghebretinsae
*Assistant Examiner* — Gennadiy Tsvey
(74) *Attorney, Agent, or Firm* — Joseph Kolodka; James Bitetto

(57) ABSTRACT

Beamforming methods and systems are described in which differential channel estimation can be computed based on measured power at receiver. Simultaneous activation of antennas in separate pairs can be used to determine relative phases of antennas with respect to a reference antenna based on the power measurements. In turn, the beam forming signals can be weighted in accordance with the relative phases to adapt the signals to a multipath environment. Existing power measurement capabilities of conventional receivers can be employed to achieve approximate channel estimates.

16 Claims, 3 Drawing Sheets

BEAMFORMING METHODS AND SYSTEMS EMPLOYING MEASURED POWER AT A RECEIVER TO PERFORM CHANNEL ESTIMATION

RELATED APPLICATION INFORMATION

This application claims priority to provisional application Ser. No. 61/177,052 filed on May 11, 2009, incorporated herein by reference.

BACKGROUND

1. Technical Field

The present invention relates to beamforming and, more particularly, to performing channel estimation to determine weights of beaminforming signals.

2. Description of the Related Art

Wireless local area networks (WLANs) have become an important last-mile technology for providing interne access within homes and enterprises. In such indoor deployments, the wireless channel suffers from significant multipath scattering and fading that degrades performance. One way to cope with such multipath effects is through reactive media access control (MAC) layer mechanisms, such as retransmissions or rate adaptation. Recent developments in smart antenna technologies provide a proactive means to alleviate these multipath impairments. Such proactive smart antenna technologies vary with respect to the sophistication of signal processing at the transmitter (Tx) and receiver (Rx). Examples these technologies include Multiple Input Multiple Output (MIMO), Directional antennas (Dir) and beamforming (Bf).

MIMO is a popular strategy that uses multiple antenna elements at the Tx and Rx and leverages the rich scattering nature of the environment to increase the link capacity. In open-loop MIMO schemes, the receiver performs channel estimation to determine the multipath channel, which then uses this information to appropriately process the received signal. In closed-loop MIMO schemes, the estimated channel is known to the Tx as well. Such knowledge of the channel permits the Tx to control the instantaneous amplitude and phase of the signals transmitted on the different antenna elements to exploit the multipath channel.

In directional antennas approaches, used popularly for outdoor scenarios, the transmission pattern is preset to point a main lobe (providing high gain) in the direction of the Rx. Because the transmit pattern is oblivious to channel state information, Dir is affected by multipath propagation and has been shown to be less effective in handling multipath in indoor environments.

In contrast, Beamforming (Bf) is a closed-loop technique that uses the channel information to modify the transmitted signal such that the signals received through the multiple paths are reinforced at the Rx, thereby improving the link Signal to Noise Ratio (SNR). Unlike other MIMO techniques, beamforming does not require multiple elements at the clients and its benefits can be attained even with omni-directional clients.

SUMMARY

A problem with known smart antenna techniques, especially beamforming techniques, is that the receiver is required to perform channel estimation to permit the transmitter to adapt the beamforming signals to the multipath environment. However, currently available conventional, off-the-shelf clients, such as Wi-Fi clients, do not have the capability to estimate the channel coefficients. Accordingly, to implement known beamforming methods, specialized clients with the capability of measuring amplitude and phase of received signals must be employed. Furthermore, even with specialized clients, hardware impairments, such as frequency and phase offsets, tend to corrupt the estimated channel. For example, a lack of synchronization between the Tx and Rx hardware introduces errors in channel estimation, making the process more complicated. In addition, specializing clients not only adds to the complexity of the system, but also introduces processing delays. Moreover, there is additional feedback overhead in transferring this information to the transmitter.

To address these problems, exemplary embodiments of the present invention can employ intelligent channel estimation schemes that perform measurements in space. For example, in exemplary embodiments, estimates of the differential channel between antenna elements can be made, as opposed to the absolute channel for a given antenna element. These approaches are robust to hardware impairments, such as oscillator drifts and lack of synchronization between the Tx and Rx. Furthermore, exemplary embodiments can permit either a transmitter or a receiver to perform indirect channel estimation to adapt beamforming signals to a multipath environment by basing the channel estimates on power measurements at a receiver. Thus, channel estimation need not involve direct measurement of amplitude and phase at the receiver, as power measurements can be used to approximately estimate the differential channel.

One exemplary embodiment of the present invention is drawn towards an adaptive beamforming method. In accordance with the method, different pairs of antenna elements can be activated, where a reference antenna element is included in each pair and is activated in tandem with the other antenna element of each pair. Thereafter, indications of relative phases of the antennae elements with respect to the reference antenna element can be received from a receiver. Further, beamforming signals transmitted from the antenna elements can be weighted based on the relative phases to adapt the beamforming signals to a multipath environment and thereby improve a signal to noise ratio. Here, the relative phases are computed from powers of the signals received from tandem activation of each of the pairs of antenna elements measured at the receiver.

Another exemplary embodiment of the present invention is directed to a method for receiving beamforming signals. The method may comprise receiving signals generated by successive activation of different pairs of antenna elements at a transmitter. One of the antenna elements is a reference antenna element that is included in each pair and is activated in tandem with the other antenna element in each pair. Thereafter, the power of each of the signals can be measured and indications of relative phases of the antennae elements with respect to the reference antenna element can be transmitted. Subsequently, beamforming signals transmitted from the antenna elements can be received. The beamforming signals can be weighted based on the relative phases to adapt the beamforming signals to a multipath environment and thereby improve a signal to noise ratio. In addition, the relative phases are computed from the powers of the signals received from tandem activation of each of the pair of antenna elements.

An alternative exemplary embodiment of the present invention is directed to a beamforming system. The system may include a transmitter configured to successively activate pairs of antenna elements to generate signals, where one of the antenna elements is a reference antenna element that is included in each pair and is activated in tandem with the other antenna element in each pair. The system may further include a receiver configured to receive and measure the powers of the signals and to transmit indications of relative phases of the antennae elements with respect to the reference antenna element to the transmitter. The transmitter is further configured to weight beamforming signals transmitted from the antenna elements to the receiver based on the relative phases to adapt the beamforming signals to a multipath environment and thereby improve a signal to noise ratio. The relative phases can be computed by the transmitter or the receiver from the powers of the signals received from tandem activation of each of the pair of antenna elements.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
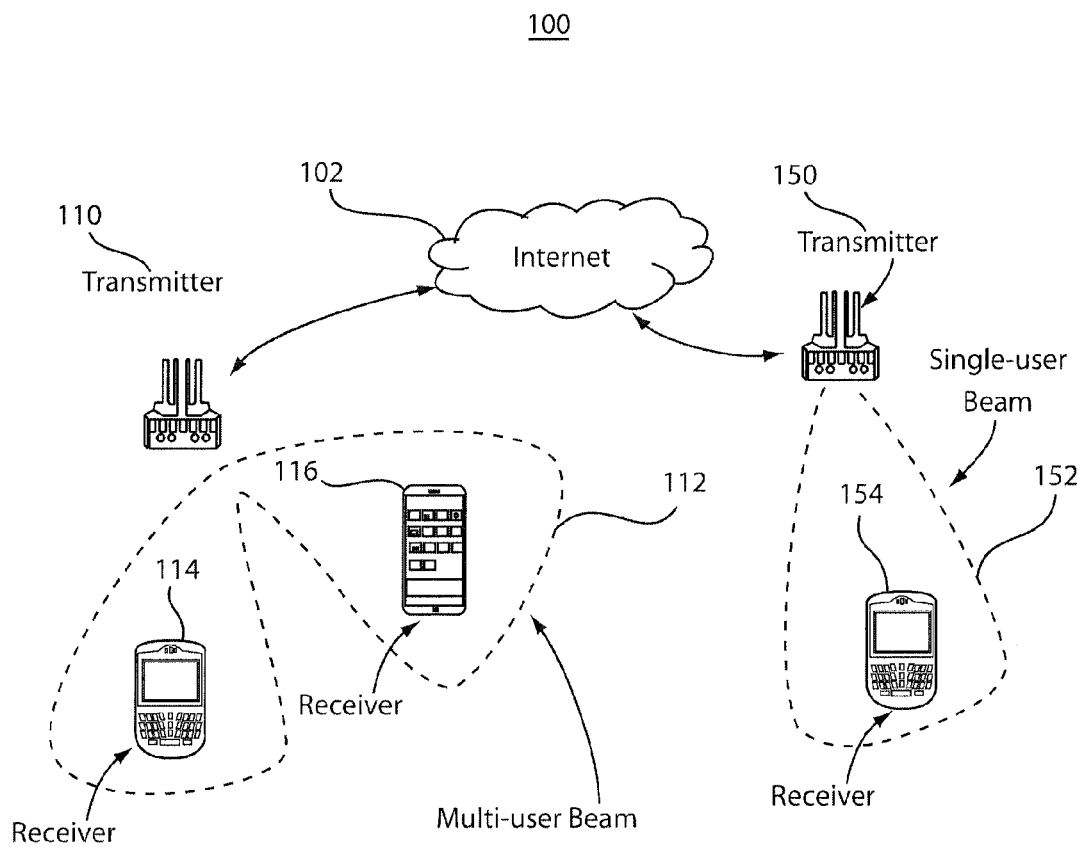
FIG. 1 is a block/flow diagram of a beamforming system in accordance with exemplary embodiments of the present invention.

As noted above, indoor wireless channels are often impaired by random fluctuations in signal level across time and space, referred to as fading. Fading is caused by multipath scattering of transmitted signals and fundamentally impacts wireless performance, leading to fluctuating data rates and even loss of connectivity. To mitigate the effect of fading, multiple transmit antenna elements together with appropriate signal processing can be used to a) increase the Signal to Noise Ratio (SNR), and b) decrease the error rate, at the receiver. This is because the probability of multiple and ideally independent channels created by the antenna elements all being in a fade at the same time reduces with an increase in the number of elements. Specifically, when multiple antenna elements are separated by a distance of the order of the wavelength (of the electromagnetic carrier signal) used, the channel gains at each of the elements is independent.

One smart antenna based technique addressing the channel fading problem, as noted above, is beamforming. In accordance with beamforming methods, the transmissions from each of a plurality of antenna elements at the transmitter (Tx) are adjusted in both magnitude and phase. Beamforming is a closed-loop technique, as channel information is employed at the transmitter. The beam pattern resulting from beamforming may not have the single main lobe structure (pointing in the direction of the receiver) of a directional antenna, but is optimized to reinforce the multipath components of the signals arriving at the receiver (Rx) from the different Tx antenna elements, which maximizes the SNR. Compared to MIMO, beamforming can be employed even when only one end of the link (Tx or Rx) has multiple antennas. Additionally, beamforming is complementary to closed-loop MIMO and the two techniques can be used together.

When a transmitter with K antenna elements communicates with a receiver, which has a single antenna element that can only produce an omni-directional radiation pattern, the wireless channel so formed is called a Multiple Input Single Output (MISO) channel. The baseband channel model for a MISO channel can be represented as $$y = h^T x + z \quad (1)$$

where the column vector $h = [h_1 h_2 \ldots h_K]^T$ is the vector of channel gains between each Tx antenna and the Rx antenna, x is the K×1 vector of the transmitted signals, y is the received signal and z is the additive White Gaussian noise. A beamformer is defined as a vector of complex numbers $w = [w_1 w_2 \ldots w_K]$ which translates each transmit symbol s to the signal vector x=ws to be transmitted from the K antennas. By estimating the channel at the Rx and conveying it to the Tx, the beamformer can be adjusted to be the complex conjugate of the channel, so that the spatial channels from each Tx antenna combine coherently and reinforce each other at the Rx. Thus, the optimal beamformer is given by $w = h^*$, where * denotes the complex conjugate. Application of weights to each antenna element adjusts the magnitude and phase of the signal transmitted from that element. This process of using channel feedback from the Rx to optimize the beam pattern at the Tx so that the Signal to Noise Ratio (SNR) at the Rx is maximized is called beamforming or adaptive beamforming. Measurements in a real indoor office environment have shown that Bf yields significant benefits compared to Dir and Omni.

Although the potential gains of beamforming are large, there are several challenges that hinder the realization of these gains. The most important of these is that accurate channel estimation is needed to adapt the transmit weights. A conventional channel estimation procedure involves activating each antenna in isolation and transmitting a fixed sequence of bits (preamble) on each antenna. This procedure is repeated for each of the antennas. The received complex baseband symbols (i.e., the amplitude and phase) are then used to determine the complex channel gain $h_i$ using the structure of the preamble. The accuracy of the received symbol value for all the preamble bits determines the accuracy of the channel estimates. Given the conventional channel estimation procedure, it becomes clear that exact received symbol values are essential in conventional methods.

Thus, known beamforming methods require symbol level processing, additional hardware support and large feedback overhead for channel estimation. Consequently, it is not practically feasible to realize these known methods using off-the-shelf commercial clients, such as WiFi clients, because the capability to do so is not currently available on these commercial clients. Furthermore, hardware impairments associated with these methods, such as oscillator drifts and the lack of synchronization between the Tx and Rx, also makes it difficult to accurately estimate the channel. In accordance with exemplary aspects of the present invention, practical strategies that achieve close to ideal beamforming gains can be implemented on off-the-shelf commercial receivers, such as 802.11 receivers. In particular, exemplary embodiments described herein below can be employed to perform channel estimation using differential phase estimate procedures based on already-existing power measurement capabilities of conventional receivers, such as Wi-Fi clients. According to exemplary aspects of the present invention, the complex beamformer weights can be computed using only the received signal power estimates (as opposed to per symbol amplitude computation). A practical consequence of this is that now received signal strength indications (RSSI) (which is available on any off-the-shelf WiFi client) is sufficient to compute the beamformer weights. In addition, as differential phase estimation can be utilized, accurate channel estimates are obtained even in the presence of hardware impairments such as oscillator drifts.

Referring now in detail to the figures in which like numerals represent the same or similar elements and initially to FIG. 1, an exemplary beamforming system that determines weight distribution of signals transmitted from a plurality of antennae based on channel estimates derived from measured power at a receiver in accordance with an exemplary embodiment of the present invention is illustrated. As shown in FIG. 1, the system may include a wired network, such as the internet 102, and transmitters or access points (AP) 110 and 150, each of which includes a plurality of transmitting antennae to generate beams for transmission of information to receivers. Each transmitter may be configured to employ a single-user beam 152 to communicate with a wireless receiver 154 and/or a multi-user beam 112 to communicate with a plurality of wireless receivers, such as receivers 114 and 116. As mentioned above, the system may be modeled as a MISO system in which the receivers employ a single, omni-directional antenna. Further, the transmitters 110 and 150 and receivers 114, 116 and 154 can operate within an indoor environment, where transmissions are generally scattered along multiple paths.

It should be understood that embodiments described herein may be entirely hardware or including both hardware and software elements. In a preferred embodiment, the present invention is implemented in hardware and software, which includes but is not limited to firmware, resident software, microcode, etc. In particular, method embodiments described herein below may be performed by a processor employing storage devices within hardware transmitters and receivers of system 100.

Further, embodiments may include a computer program product accessible from a computer-usable or computer-readable storage medium providing program code for use by or in connection with a computer or any instruction execution system. Specifically, the program code can be configured to perform, using a processor and storage medium, any of the methods described herein below. A computer-usable or computer readable storage medium may include any apparatus that stores the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 2:
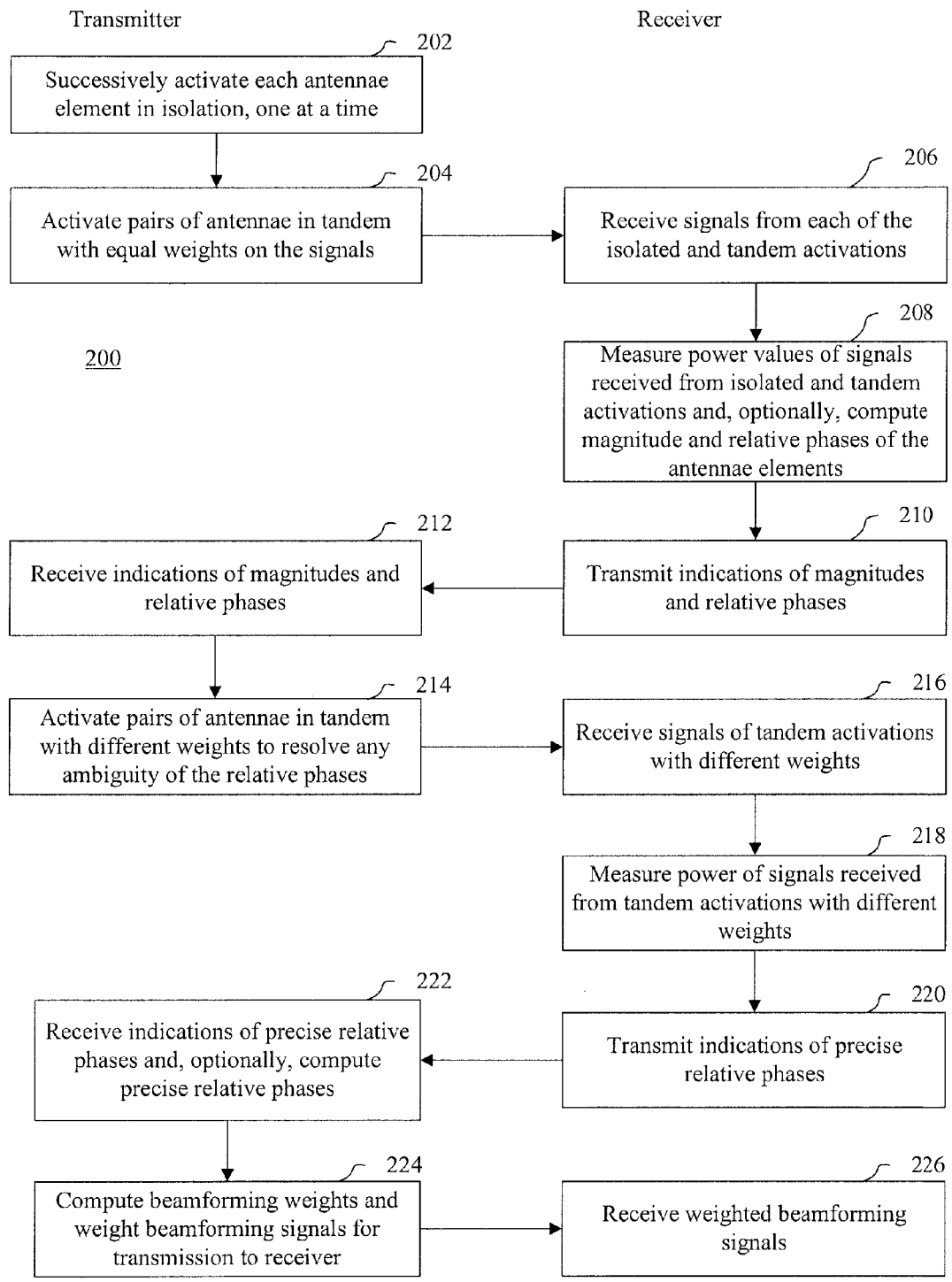
FIG. 2 is a block/flow diagram of an exemplary beamforming method in accordance with exemplary embodiments of the present invention.

With reference now to FIG. 2 with continuing reference to FIG. 1, a beamforming method in accordance with an exemplary embodiment of the present invention that can be implemented within system 100 is illustrated. Here, beamforming can include two main components, namely channel estimation and beamformer weight computation. As noted above, the optimal beamformer weight vector is related to the channel vector as w=h*. Hence, when the channel vector h is determined, the weight vector can be easily computed. Thus, given the channel estimates, the beam-former weight computation is straightforward. The channel estimation can include two stages: (1) The measurement setup stage and (2) the estimation and feedback stage. As discussed herein below, according to exemplary aspects, multiple antennas can be activated in tandem followed by a channel estimation stage where signal power values are fed-back from the clients.

It should be understood that any reference to a "transmitter" can refer to any one of the transmitters provided in FIG. 1. Similarly, any reference to a "receiver" can refer to any one of the receivers provided in FIG. 1. Further, method steps that can be performed by a transmitter are provided in the left column of FIG. 2, while method steps that can be performed by a receiver are provided in the right column of FIG. 2.

Exemplary method 200 is based on the idea of estimating differential channel phases by employing tandem activation of more than one antenna using received power estimates. Thus, the estimation process is distributed across space (elements). In conventional channel estimation, when a single antenna is activated at a time, the received power is dependent only on the channel magnitude and is given by $P_i=|h_i|^2$ (assuming the transmitter power is unity) for transmitter antenna i. Hence, the information about the channel phase $\arg(h_i)$ is lost when the power is computed. In contrast, by the tandem activation of more than one antenna element, the effects of the channel phases are also reflected in the received power in a manner that depends on the relative channel phases. In other words, when two antenna elements i and j are excited simultaneously with equal weights (such that the Tx power still adds up to the maximum transmittable power), the received power can be computed as $P_{ij}=|h_i+h_j|^2$. Thus, for tandem excitation, the received power $P_{ij}$ is given as $$P_{ij}=P_i+P_j+2*\sqrt{P_i*P_j}*\cos(\theta_{ij}) \qquad (2)$$

where $\theta_{ij}$ is the channel phase difference between $h_i$ and $h_j$. Depending on the relative channel phase $\theta_{ij}$, the two signals combine together to change the signal power at the receiver. When $\theta_{ij}=0$, the signals combine constructively causing the powers of the individual elements to add up at the Rx. However, when $\theta_{ij}=180$, the signals combine destructively causing the received power to be the difference of the powers from the individual antennas. Hence, the change in the received power across a strategic set of activations can be used to identify the relative channel phase between the channel gains by rewriting Equation 2 as $$\theta_{ij} = \cos^{-1}\frac{P_{ij} - P_i - P_j}{2*\sqrt{P_i*P_j}} \qquad (3)$$

By applying this concept repetitively for pairs of antenna elements, the relative phases of all the antenna elements can be obtained. Because all the channel phases should be measured with respect to the same reference for estimates to be meaningful, element 1 is designated as the reference element. Thus, j in $\theta_{ij}$ can be set to 1 and $\theta_{ij}$ can be denoted as $\theta_{i1}$. The channel gain magnitudes, in turn, can be obtained directly from the power measurements by activating each antenna element individually as $|h_i|=\sqrt{P_i}$. When used along with the relative phases, the beamformer weights can be determined as $w_i=\sqrt{P_i}e^{j\theta_{i1}}$ for i>1 and $j=\sqrt{-1}$ with $\theta_{i1}=0$. It should also be noted that, irrespective of the number of antennas used, the total transmitted power can be ensured to remain constant by normalizing the weights. Further, a received signal strength indication (RSSI) can be used in method 200 as a power measurement to identify optimal beamforming weights. RSSI is a convenient power measure, as it is already employed by conventional wireless cards in widespread use. However, it should be noted that other power measurements may be used in alternative embodiments of the present invention.

Method 200 may begin at step 202, in which the transmitter may successively activate each antennae element in isolation, one at a time. For example, here, in the single antenna activation stage, each one of the K antenna elements is activated in isolation, i.e. one at a time, transmitting S consecutive packets for each antenna element. S is a parameter that can be increased for more accurate estimates but can be chosen to be small to keep the overhead of the estimation process low. One suitable value for S is S=5.

At step 204, the transmitter may activate pairs of antennae in tandem with equal weights on the signals transmitted from the pairs of antennae. For example, two antenna elements can be activated at a time, where one of the two antennas in each activation is the reference antenna element and the other antenna of the pair is chosen successively from the second to the $K^{th}$ antenna.

At step 206, the receiver may receive the signals generated at steps 202 and 204.

At step 208, the receiver may measure the power values of the signals received from each of the isolated and tandem activations and may, optionally, compute the magnitude and relative phases of the antennae elements. For example, the K−1 received signal power values ($P_{i1}$) for each of the tandem activations is measured at the Rx along with the K average signal powers ($P_1$ for the reference antenna element, $P_i$ for i>1) for the single, isolated activations. As noted above, the measured power values may be RSSI measurements. These 2K−1 values may then be used to compute the magnitudes $|h_i|=\sqrt{P_i}$, $1 \leq i \leq K$ and the relative phases $\phi_{i1}$, $1<i \leq K$ from Equation 3. The computation of the magnitudes and/or the relative phases can alternatively be computed at the transmitter at step 212, below.

At step 210, the receiver may transmit indications of the magnitudes and relative phases of the antennae elements to the transmitter. For example, the K magnitudes $|h_i|$ and the K−1 relative phases may be conveyed to the transmitter in a single packet. Alternatively, if the magnitude and relative phase computations are performed by the transmitter, the receiver may transmit the power values measured at step 208, which act as the indications of the magnitude and relative phases, to the transmitter.

At step 212, the transmitter may receive the indications of the magnitudes and relative phases of the antennae elements and may, optionally, compute the magnitude and relative phases of the antennae elements in the manner discussed above, for example, if the receiver does not or is not configured to do so itself.

At step 214, the transmitter may activate pairs of antennae in tandem with different weights to resolve any ambiguity of the relative phases. For example, while the magnitudes obtained from the isolated activations are accurate, the phases $\phi_{ij}$ (in radians), or $\phi_{i1}$ if the reference antenna element is denoted by j=1, have an ambiguity due to the use of the $\cos^{-1}$ function in Equation 3 in that the correct $\theta_{ij}$ can be either of $\phi_{ij}, -\phi_{ij}, \pi-\phi_{ij}, -(\pi-\phi_{ij})$. To resolve the ambiguity, transmitter can again successively activate the k−1 pairs in tandem, one at a time, with modified amplitude and phase weights. In other words, element 1, the reference antenna element, can be activated using the magnitude $$\sqrt{\frac{P_1}{P_1+P_i}}$$

and phase '0' for signals transmitted from element 1, whereas element i, i>1 can be activated with a magnitude $$\sqrt{\frac{P_i}{P_1+P_i}}$$

and each of the phases $\phi_{ij}, -\phi_{ij}, \pi-\phi_{ij}, -(\pi-\phi_{ij})$ for signals transmitted from element i. Hence, for each of the K−1 pairs, there are four activations corresponding to these four phases, which are referred to herein as "the quadruple." It should be noted that the relative magnitudes can be chosen such they are the same as the magnitudes that would eventually be used by the beamformer for transmission to the receiver. Thus, when using these magnitudes, only the ambiguity in the phase is resolved at step 214.

At step 216, the receiver may receive the signals transmitted at step 214.

At step 218, the receiver may measure the power of each of the signals received at step 216 and, at step 220, may transmit an indication of the correct or precise relative phase for each pair of antennae elements. For example, of the four choices in each quadruple, the receiver may identify the choice which yields the largest power or signal strength at the receiver and notes that choice as the unambiguous relative phase for each of the non-reference antenna elements, i.e. element 2 to element K. The receiver may transmit the precise relative phase for each of the non-reference antenna elements to the transmitter. Alternatively, the indication of the correct phase for each pair of antennae elements can be the power of one or more of the transmitted signals. In this scenario, the transmitter may obtain from the receiver all the power measurements obtained at step 218, or only the highest power measurement in each quadruple, and may select the correct phase based on the power measurements.

At step 222, the transmitter may receive the indications of the precise relative phases and may, optionally, compute the precise relative phases in the manner discussed above if the receiver does not or is not configured to do so itself.

At step 224, the transmitter may compute beamforming weights for the beamforming signals and may weight the beamforming signals for the transmission of data to the receiver by applying the beamforming weights using the computed magnitudes and resolved relative phases of the antennae elements. For example, the final beamforming weights for each antenna element i can be given by the magnitude $$|w_i| = \sqrt{\frac{P_i}{\sum_{l=1}^{K} P_l}}$$

and the phase $\theta_{i1}$. Thus, the beamforming weight $w_i$ for the beamforming signal transmitted from antenna element i can be given by $$w_i = \sqrt{\frac{P_i}{\sum_{l=1}^{K} P_l}} e^{j\theta_{i1}},$$

where i>1, $j=\sqrt{-1}$, and $\Sigma_{l=1}^{K} P_l$ is the sum of the powers, measured at the receiver, of the signals received from the isolated activation of each the antenna elements. In turn, the beamforming weight $w_1$ for the beamforming signal transmitted from antenna element 1 can be given by $$w_1 = \sqrt{\frac{P_1}{\sum_{l=1}^{K} P_l}}.$$

As noted above, the beamforming weights can be applied to adapt the beamforming signals to a multipath environment and thereby improve a signal to noise ratio.

At step 226, the receiver may receive the weighted beamforming signals generated at step 224.

Figure 3:
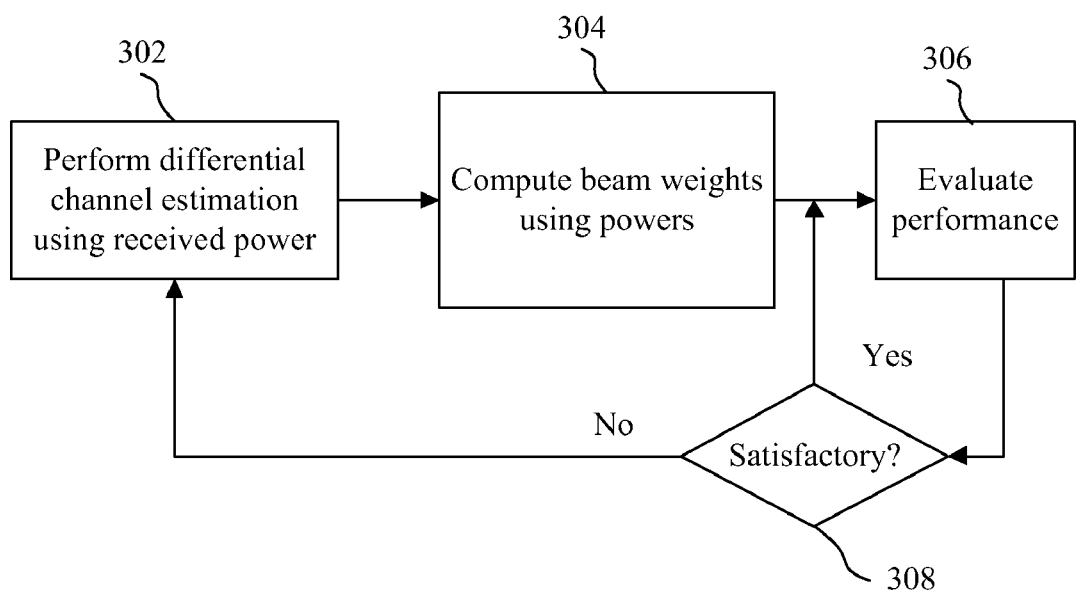
FIG. 3 is a block/flow diagram of an exemplary beam forming method/system including adaptive performance evaluations in accordance with exemplary embodiments of the present invention.

With reference now to FIG. 3, a high-level block/flow diagram illustrating a system/method 300 in accordance with exemplary embodiments of the present invention is illustrated. Here, as in the above-described embodiments, differential channel estimation can be computed and conveyed to a transmitter using power measurements, such as RSSI, at the clients. Indications of the channel coefficients can be fed back to the transmitter, which can use the indications to compute beamformers. At block 302, differential channel estimation using received power can be performed. For example, steps 202-222 of method 200 can be implemented at block 302. At block, 304, beam weights can be computed using the powers. For example, step 224 of method 200 can be implemented at block 304. Thereafter, at block 306, performance of the beam weights are evaluated. For example, SNRs of the weighted beamforming signals can be measured at a receiver and transmitted to the transmitter. At block 308, the transmitter can determine whether the beam weight performance is satisfactory. For example, the transmitter may compare the SNR measurements received from the receiver to an SNR threshold. If the beam weight performance is satisfactory, blocks 306 and 308 may be repeated. Otherwise, blocks 302 and 304 are repeated. For example, if the received SNR measurements are above the SNR threshold, then the beam weight performance can be deemed satisfactory and blocks 306 and 308 may be repeated. Otherwise, the beam weight performance can be deemed unsatisfactory and blocks 302 and 304 are repeated. The continual evaluation permits the method/system 300 to adapt to varying environmental conditions, which may change the multipath channel.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An adaptive beamforming method comprising:
   successively activating different pairs of antenna elements, wherein one of the antenna elements is a reference antenna element that is included in each pair and is activated in tandem with the other antenna element in each pair;
   receiving indications of relative phases, at a receiver, of the antennae elements with respect to the reference antenna element;
   weighting beamforming signals transmitted from the antenna elements based on the relative phases to adapt the beamforming signals to a multipath environment and thereby improve a signal to noise ratio, wherein the relative phases are computed from powers of the signals received from tandem activation of each of the pairs of antenna elements measured at the receiver;
   activating each antenna element in isolation; and
   receiving indications of a magnitude of each signal from each of the isolated activations, wherein the weighting is further based on the magnitudes of the signals, at the receiver, received from the isolated activations and wherein the magnitudes are computed from the powers of the signals received from the isolated activations measured at the receiver.

2. The method of claim 1 claim 2, wherein the relative phases are computed by calculating $$\theta_{i1} = \cos^{-1} \frac{P_{i1} - P_i - P_1}{2 * \sqrt{P_i * P_1}},$$

where $\theta_{i1}$ is the relative phase between the reference antenna element (1) and another antenna element in a given pair of antenna elements (i,1), $P_{i1}$ is the power, measured at the receiver, of the signals received from tandem activation of the given pair of antenna elements (i,1), $P_1$ is the power, measured at the receiver, of the signal received from the isolated activation of the reference antenna element, and $P_i$ is the power, measured at the receiver, of the signal received from the isolated activation of the other antenna element in the given pair of antenna elements (i,1).

3. The method of claim 2, wherein the weighting further comprises determining a beamforming weight for beamforming signals of each corresponding antenna element (i) by calculating $$w_i = \sqrt{\frac{P_i}{\sum_{l=1}^{K} P_l}} e^{j\theta_{i1}},$$

where $w_i$ is the beamforming weight for the beamforming signal transmitted from antenna element i, i>1, j=$\sqrt{-1}$, and $\sum_{l=1}^{K} P_l$ is the sum of the powers, measured at the receiver, of the signals received from the isolated activation of each the antenna elements, and wherein the weighting further comprises determining a beamforming weight for the reference antenna element by calculating $$w_1 = \sqrt{\frac{P_1}{\sum_{l=1}^{K} P_l}},$$

where $w_1$ is the beamforming weight for the beamforming signal transmitted from the reference antenna element.

4. The method of claim 3, wherein the successively activating the different pairs of antenna elements includes applying equal weights on signals transmitted from the pairs of antenna elements and wherein the method further comprises:
   successively activating the pairs of antenna elements, where antenna elements of a pair are activated in tandem, by applying different sets of weights on transmitted signals to resolve ambiguity of the relative phases, wherein each pair of the antenna elements is allocated a different set of weights, where each given set includes different weights within the given set that are based on a relative phase computed from the tandem, equal weight activation of the pair of antenna elements to which the given set is allocated; and receiving indications of precise relative phases, at the receiver, of the antenna elements with respect to the reference antenna element, wherein the weighting is based on the precise relative phases and wherein the precise relative phases are determined by selecting, for each pair of antenna elements, the relative phase corresponding to the weights applied to the signals transmitted from the pair of antenna elements having the highest power at the receiver among the signals transmitted from the tandem, different weight activations of the pair of antenna elements.

5. The method of claim 4, wherein the set of weights for the given pair of antenna elements (i,1) comprises $\phi_{i1}$, $-\phi_{i1}$, $\pi-\phi_{i1}$, $-(\pi-\phi_{i1})$, where $\phi_i 1$ is the relative phase computed from powers of signals received from the tandem, equal weight activation of the given pair of antenna elements (i,1), and wherein the magnitudes of the signals transmitted from the tandem, different weight activations of the given pair of antenna elements (i,1) is $$\sqrt{\frac{P_i}{P_1+P_i}}$$

for antenna element i and $$\sqrt{\frac{P_1}{P_1+P_i}}$$

for the reference antenna element.

6. The method of claim 1, wherein the indications of the relative phases are the powers of the signals received from tandem activations of each of the pair of antenna elements measured at the receiver and wherein the relative phases are computed by a transmitter including the antenna elements.

7. The method of claim 1, wherein the relative phases are computed by and transmitted from the receiver.

8. The method of claim 1, wherein the powers of the signals received from tandem activations of each of the pair of antenna elements measured at the receiver are received signal strength indications (RSSI) and wherein the relative phases are computed solely from powers of the signals received from activations of the antenna elements.

9. A method for receiving beamforming signals comprising:
receiving signals generated by successive activation of different pairs of antenna elements at a transmitter, wherein one of the antenna elements is a reference antenna element that is included in each pair and is activated in tandem with the other antenna element in each pair;
measuring the power of each of the signals;
transmitting indications of relative phases of the antennae elements with respect to the reference antenna element; and
receiving beamforming signals transmitted from the antenna elements that are weighted based on the relative phases to adapt the beamforming signals to a multipath environment and thereby improve a signal to noise ratio, wherein the relative phases are computed from the powers of the signals received from tandem activation of each of the pair of antenna elements;
receiving signals generated by successive activation of each of the antenna elements in isolation;
measuring the power of each of the signals received from the activation of each of the antenna elements in isolation; and
transmitting indications of a magnitude of each signal received from each of the isolated activations, wherein the weighting of the beamforming signals is further based on the magnitudes of the signals, and wherein the magnitudes are computed from the powers of the signals received from the isolated activations.

10. The method of claim 9, wherein the relative phases are computed by calculating $$\theta_{i1} = \cos^{-1}\frac{P_{i1}-P_i-P_1}{2*\sqrt{P_i*P_1}},$$

where $\theta_{i1}$ is the relative phase between the reference antenna element (1) and another antenna element in a given pair of antenna elements (i,1), $P_{i1}$ is the power of the signal received from tandem activation of the given pair of antenna elements (i,1), $P_1$ is the power of the signal received from the isolated activation of the reference antenna element, and $P_i$ is the power of the signal received from the isolated activation of the other antenna element in the given pair of antenna elements (i,1).

11. The method of claim 10, wherein the weighting of the beamforming signals comprises determining a beamforming weight for beamforming signals of each corresponding antenna element (i) by calculating $$w_i = \sqrt{\frac{P_i}{\sum_{l=1}^{K} P_l}}\, e^{j\theta_{i1}},$$

where $w_i$ is the beamforming weight for the beamforming signal transmitted from antenna element i, i>1, $j=\sqrt{-1}$, and $\sum_{l=1}^{K} P_l$ is the sum of the powers of the signals received from the isolated activation of each of the antenna elements, and
wherein the weighting of the beamforming signals further comprises determining a beamforming weight for the reference antenna element by calculating $$w_1 = \sqrt{\frac{P_1}{\sum_{l=1}^{K} P_l}},$$

where $w_1$ is the beamforming weight for the beamforming signal transmitted from the reference antenna element.

12. The method of claim 11, wherein the signals received from the successive activation of the different pairs of antenna elements are weighted with equal weights and wherein the method further comprises:
receiving signals that are generated by successive activation of the pairs of antenna elements, where antenna elements of a pair are activated in tandem, and are weighted by different sets of weights to resolve ambiguity of the relative phases, wherein each pair of the antenna elements is allocated a different set of weights, where each given set includes different weights within the given set that are based on a relative phase computed from the tandem, equal weight activation of the pair of antenna elements to which the given set is allocated;

measuring the power of each of the signals received from the tandem, different weight activation of each of the pair of antenna elements; and transmitting indications of precise relative phases of the antennae elements with respect to the reference antenna element, wherein the weighting of the beamforming signals is based on the precise relative phases and wherein the precise relative phases are determined by selecting, for each pair of antenna elements, the relative phase corresponding to the weights applied to the signals transmitted from the pair of antenna elements having the highest power among the signals transmitted from the tandem, different weight activations of the pair of antenna elements.

13. The method of claim 12, wherein the set of weights for the given pair of antenna elements (i,1) comprises $\phi_{i1}$, $-\phi_{i1}$, $\pi-\phi_{i1}$, $-(\pi-\phi_{i1})$, where $\phi_i 1$ is the relative phase computed from powers of signals received from the tandem, equal weight activation of the given pair of antenna elements (i,1) and wherein the magnitudes of the signals transmitted from the tandem, different weight activations of the given pair of antenna elements (i,1) is $$\sqrt{\frac{P_i}{P_1+P_i}}$$

for antenna element i and $$\sqrt{\frac{P_1}{P_1+P_i}}$$

for the reference antenna element.

14. The method of claim 9, wherein the indications of the relative phases are the powers of the signals received from tandem activations of each of the pair of antenna elements and wherein the relative phases are computed by the transmitter.

15. The method of claim 9, wherein the relative phases are computed by and transmitted from a receiver implementing the method.

16. The method of claim 9, wherein measuring the power of each of the signals constitutes determining received signal strength indications (RSSI) and wherein the relative phases are computed solely from powers of the signals received from activations of the antenna elements.

* * * * *